United States Patent
Meier et al.

(10) Patent No.: US 11,360,911 B2
(45) Date of Patent: Jun. 14, 2022

(54) DUMMY DATA REMOVAL IN AN AUTHENTICATED ENCRYPTION WITH ASSOCIATED DATA CRYPTOGRAPHIC SCHEME

(71) Applicant: Infineon Technologies AG, Neubiberg (DE)

(72) Inventors: Manuela Meier, Munich (DE); Andreas Graefe, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/948,691

(22) Filed: Sep. 29, 2020

(65) Prior Publication Data

US 2022/0100678 A1 Mar. 31, 2022

(51) Int. Cl.
*G06F 12/14* (2006.01)
*G06F 12/02* (2006.01)
*G06F 21/79* (2013.01)

(52) U.S. Cl.
CPC ...... *G06F 12/1408* (2013.01); *G06F 12/0292* (2013.01); *G06F 12/1441* (2013.01); *G06F 21/79* (2013.01)

(58) Field of Classification Search
CPC ............. G06F 12/0408; G06F 12/0292; G06F 12/1441
See application file for complete search history.

(56) References Cited

U.S. PATENT DOCUMENTS

| 10,496,552 B2 * | 12/2019 | Narayanasamy ... G06F 13/4068 |
| 2017/0222803 A1 * | 8/2017 | Tanizawa ............. H04L 63/061 |
| 2018/0121369 A1 * | 5/2018 | Poeppelmann .... G11C 16/3427 |

OTHER PUBLICATIONS

M. Noisternig, "Cryptographic transforms for a lightweight and efficient DVB link-layer security extension," 2012 IEEE First AESS European Conference on Satellite Telecommunications (ESTEL), 2012, pp. 7-7.*
C. Kaufman "Internet Key Exchange Protocol Version 2", An IP.com Prior Art Database Technical Disclosure, Oct. 2014.*

\* cited by examiner

*Primary Examiner* — Pierre Michel Bataille
(74) *Attorney, Agent, or Firm* — Harrity & Harrity, LLP

(57) ABSTRACT

A cryptographic accelerator may include an input buffer to store first data, including a first portion of a message, in a first address range and second data, including a second portion of the message, in a second address range. The cryptographic accelerator may include one or more components to determine lengths of the first and second portions, read the first portion from the first address range, discard any dummy data in the first address range based on an indication of an endpoint of the first data in the first address range, read the second portion from the second address range, and discard any dummy data in the second address range based on an indication of an endpoint of the second data in the second address range. The cryptographic accelerator may include a cryptographic engine to perform a cryptographic operation using the first portion and the second portion.

20 Claims, 5 Drawing Sheets

DUMMY DATA REMOVAL IN AN AUTHENTICATED ENCRYPTION WITH ASSOCIATED DATA CRYPTOGRAPHIC SCHEME

BACKGROUND

A message in a secure communication scenario in some cases includes at least two parts—an additional authenticated data portion (AAD) that is authenticated only, and a plain text portion that is both authenticated and encrypted. A cryptographic operation that performs this authenticated encryption is referred to as an authenticated encryption with associated data (AEAD). AEAD can be used to simultaneously assure confidentiality and authenticity of data. Generally, the AAD portion includes message header information, while the plain text portion includes a message payload.

SUMMARY

In some implementations, a cryptographic accelerator includes an input buffer to store first data in a first address range, the first data including a first portion of a message, and store second data in a second address range, the second data including a second portion of the message; one or more components to determine a length of the first portion and a length of the second portion, read the first portion from the first address range based on the length of the first portion, discard any dummy data in the first address range based on the length of the first portion and an indication of an endpoint of the first data in the first address range, read the second portion from the second address range based on the length of the second portion, discard any dummy data in the second address range based on the length of the second portion and an indication of an endpoint of the second data in the second address range; and a cryptographic engine to perform a cryptographic operation using the first portion and the second portion.

In some implementations, a system includes a memory to store a first portion of a message and a second portion of the message; a direct memory access component to provide first data to a cryptographic accelerator, the first data including the first portion of the message, and provide second data to the cryptographic accelerator, the second data including the second portion of the message; and the cryptographic accelerator to store the first data in a first address range of an input buffer; store the second data in a second address range of the input buffer; determine a length of the first portion and a length of the second portion after the first data is stored in the first address range and after the second data is stored in the second address range; discard any dummy data included in the first data based on the length of the first portion and an indication of an endpoint of the first data; and discard any dummy data included in the second data based on the length of the first portion and an indication of an endpoint of the second data.

In some implementations, a method includes storing first data in a first address range of an input buffer of a cryptographic accelerator, the first data including a first portion of a message; storing second data in a second address range of the input buffer of the cryptographic accelerator, the second data including a second portion of the message; determining a length of the first portion and a length of the second portion; obtaining the first portion of the first data from the first address range based on the length of the first portion and the length of the first data, obtaining the second portion of the second data from the second address range based on the length of the second portion and the length of the second data; and performing a cryptographic operation using the first portion obtained from the first address range and the second portion obtained from the second address range.

DETAILED DESCRIPTION

Figure 1A:
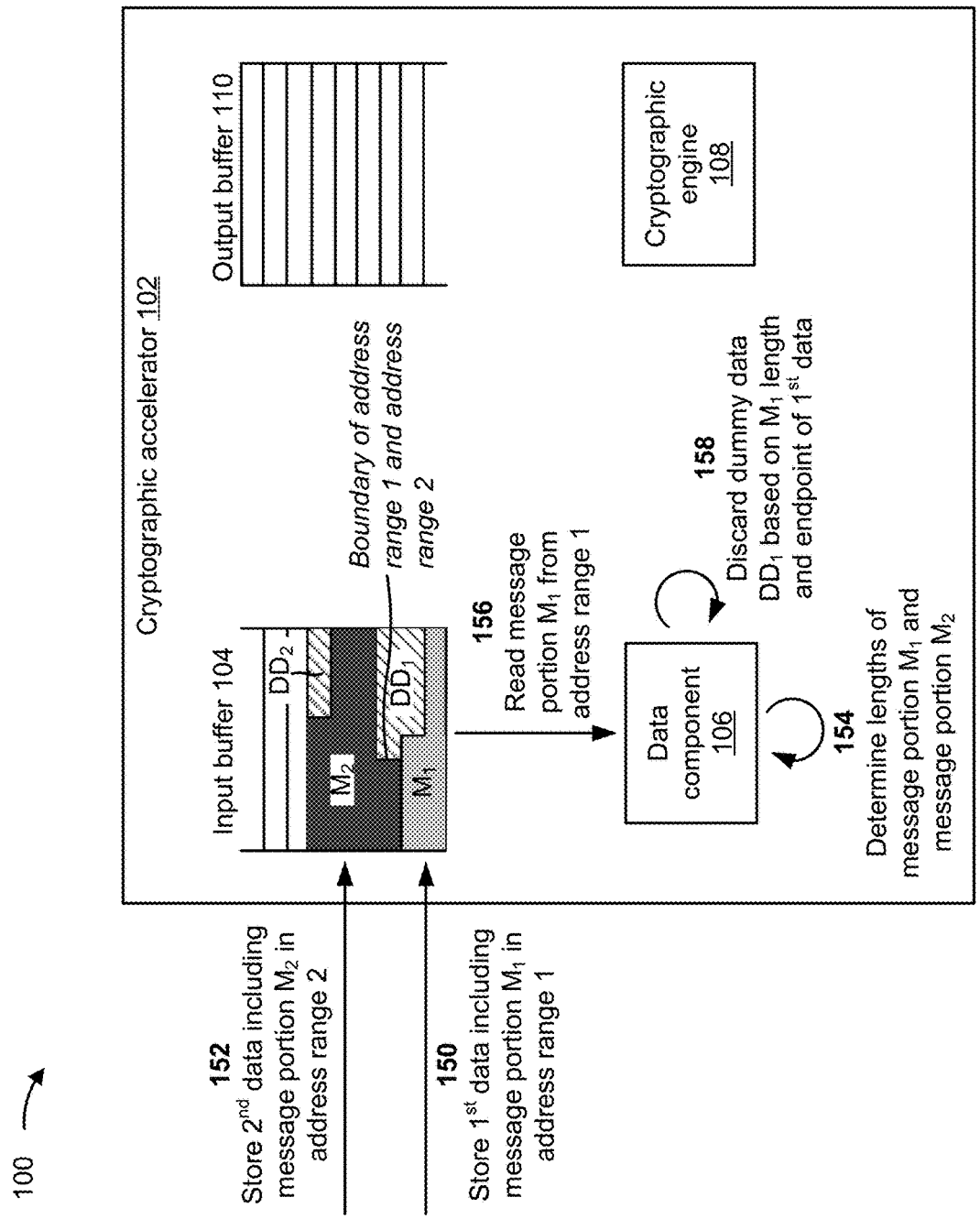
FIGS. 1A-1C are diagrams illustrating an example of dummy data removal in an AEAD cryptographic scheme, in accordance with various aspects of the present disclosure.

The following detailed description of example implementations refers to the accompanying drawings. The same reference numbers in different drawings may identify the same or similar elements.

In an AEAD cryptographic scheme, an AAD portion of a message and a plain text portion of the message are independent. Therefore, the AAD portion and the plain text portion are typically processed/generated by different software tasks and are stored at different locations in a random access memory (RAM) of a microcontroller. That is, the portions of the message are not concatenated inside the RAM. To move both types of data to a cryptographic accelerator (e.g., an advanced encryption standard (AES) engine), a direct memory access (DMA) can be used.

Generally, to increase a throughput on a bus of the system, a largest transfer size of the bus (e.g., burst access) can be used. However, use of the largest transfer size of the bus results in so-called dummy data being moved into the cryptographic accelerator in a scenario in which a size of the AAD portion or a size of the plain text portion is not a multiple of the transfer size of the bus. Similarly, when a particular buffer size is allocated for header generation (e.g., an AAD portion of a message), a given header might have a different size per frame. Thus, software may generate a header that may be smaller than the buffer size. Here, if a DMA is configured to transfer the entire allocated buffer size, dummy data may appear between the AAD portion and the plain text portion (independent of the bus transfer size). This is problematic for a cryptographic accelerator that uses a first-in first-out (FIFO) input buffer because the dummy data must not be included in the cryptographic operation.

Conventionally, to prevent dummy data from being included in the cryptographic operation, word or byte accesses are required to enable only valid data to be transferred. However, use of word or byte access reduces throughput of the system bus. Another technique for addressing the issue of dummy data is to make the size of the AAD portion and the size of the plain text portion known to the cryptographic accelerator before a data transfer starts (i.e., before the AAD portion or the plain text portion are provided to the cryptographic accelerator). However, this increases latency and is less flexible for software handling.

Some implementations described herein enable dummy data removal in an AEAD cryptographic scheme. In some implementations, a cryptographic accelerator includes an input buffer to store first data in a first address range, where the first data includes a first portion of a message (e.g., an AAD portion of a message), and to store second data in a second address range, where the second data includes a second portion of the message (e.g., a plain text portion of the message). The cryptographic accelerator further includes one or more components to determine a length of the first portion and a length of the second portion. The one or more components then read the first portion from the first address range based on the length of the first portion and discard any dummy data in the first address range based on the length of the first portion and an indication of an endpoint of the first data in the first address range. The one or more components also read the second portion from the second address range based on the length of the second portion and discard any dummy data in the second address range based on the length of the second portion and an indication of an endpoint of the second data in the second address range. The cryptographic accelerator further includes a cryptographic engine to perform a cryptographic operation using the first portion and the second portion.

In this way, the cryptographic accelerator is improved such that the cryptographic accelerator is able to distinguish valid data from dummy data for a given portion of a message and, therefore, can (automatically) remove the dummy data even without knowledge of a size of the portion of message prior to message data being transmitted to/received by the cryptographic accelerator. Put another way, the improved cryptographic accelerator enables automatic removal of dummy data even when length values of portions of a message are not configured when a data transfer started. As a result, a largest transfer size of the bus can be used, thereby improving throughput of the system bus, which improves flexibility and latency when data is transferred using, for example, a DMA.

Figure 1B:
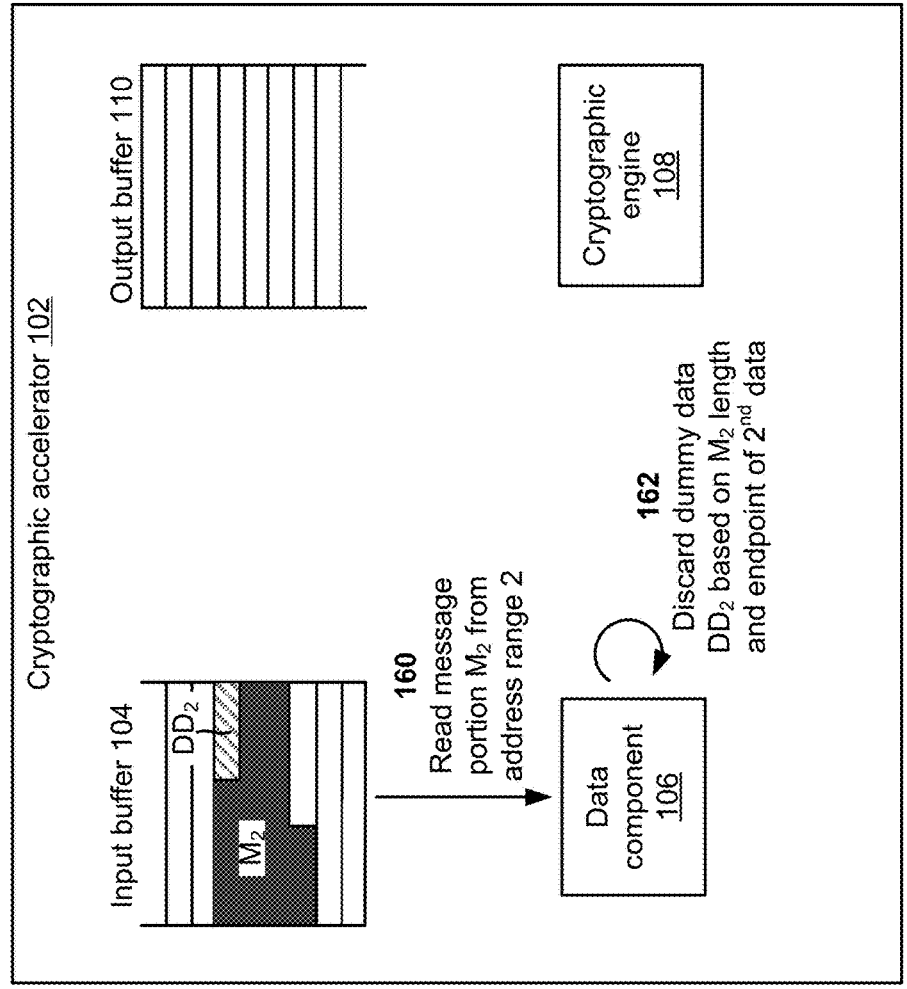
Figure 1C:
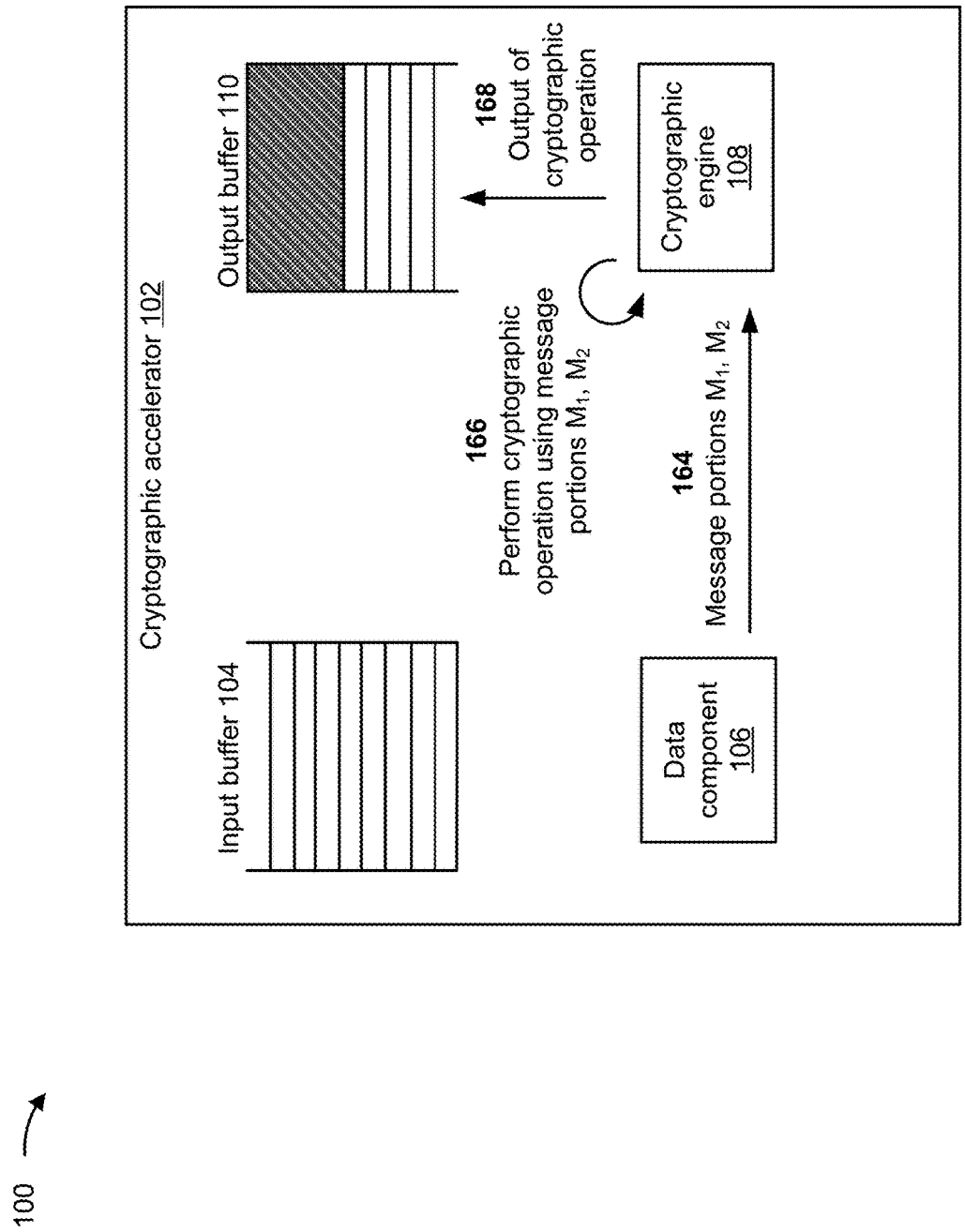

FIGS. 1A-1C are diagrams illustrating an example 100 of dummy data removal in an AEAD cryptographic scheme, in accordance with various aspects of the present disclosure.

As shown in FIGS. 1A-1C, example 100 includes a cryptographic accelerator 102. In some implementations, cryptographic accelerator 102 may be a component in a system, such as a system on a chip (SoC). As shown in FIG. 1A, cryptographic accelerator 102 may comprise an input buffer 104, a data component 106, a cryptographic engine 108, and an output buffer 110. Descriptions of cryptographic accelerator 102 and the various components of cryptographic accelerator 102 are provided below, followed by a description of an example of operation of the cryptographic accelerator 102.

Cryptographic accelerator 102 is component to perform cryptographic operations for the system. In some implementations, cryptographic accelerator 102 may be a co-processor of the system. In some implementations, cryptographic accelerator 102 improves performance of the system by providing hardware for performance of cryptographic operations (rather than cryptographic operations being performed by software and/or by a general purpose central processing unit (CPU) of the system).

Input buffer 104 is a component of cryptographic accelerator 102 that holds data received by the cryptographic accelerator 102 prior to the data being processed by one or more other components of cryptographic accelerator 102. In some implementations, the input buffer 104 may be a FIFO-based buffer. In some implementations, data is stored in a particular address range of input buffer 104 in association with enabling dummy data removal, as described herein. In some implementations, data stored in input buffer 104 includes a portion of a message (e.g., an AAD portion, a plain text portion, a nonce, or the like), as described below.

Data component 106 includes one or more components of cryptographic accelerator 102 that perform one or more operations associated with dummy data removal, as described herein. For example, data component 106 may include a component to determine a length of a portion of a message, a component to read the portion of the message from an address range of input buffer 104, and a component to discard any dummy data from the address range of input buffer 104, as described in further detail below. In some implementations, data component 106 can also be referred to as a data part, a frame component, or a frame part.

Cryptographic engine 108 is a component of cryptographic accelerator 102 to perform a cryptographic operation using portions of data read by data component 106. For example, cryptographic engine 108 may include an AES engine.

Output buffer 110 is a component of cryptographic accelerator 102 that holds data to be transmitted by cryptographic accelerator 102 after the data is processed by one or more other components of cryptographic accelerator 102. In some implementations, output buffer 110 may be a FIFO-based buffer.

In an example operation, starting with reference 150, input buffer 104 may store first data in a first address range (address range 1), where the first data includes a first portion of a message ($M_1$). For example, cryptographic accelerator 102 may receive the first data via a DMA component of the system (not shown), and input buffer 104 may store the first data in a first address range (e.g., 0x000 to 0x7FF). The first portion of the message is a portion of a message based on which one or more cryptographic operations are to be performed. For example, the first portion of the message may include an AAD portion of the message, a plain text portion of the message, a nonce portion of the message, or the like. In some implementations, the first data may include one or more bits of dummy data ($DD_1$) in addition to the first portion of the message. For example, when a largest transfer size of the bus is used to transfer the first data to cryptographic accelerator 102 and a size of the first portion of the message is less than the largest transfer size of the bus, the first data may be padded with one or more bits of dummy data.

As shown by reference 152, input buffer 104 may store second data in a second address range (address range 2), where the second data includes a second portion of the message ($M_2$). For example, cryptographic accelerator 102 may receive the second data via the DMA component of the system (not shown), and input buffer 104 may store the second data in a second address range (e.g., 0x800 to 0xFFF). The second portion of the message is another portion of the message (i.e., a portion other than the first portion of the message) based on which one or more cryptographic operations are to be performed. For example, the second portion of the message may include the AAD portion of the message, the plain text portion of the message, the nonce portion of the message, or the like. In some implementations, the second data may include one or more bits of dummy data ($DD_2$) in addition to the second portion of the message. For example, when a largest transfer size of the bus is used to transfer the second data to cryptographic accelerator 102 and a size of the second portion of the message is less than the largest transfer size of the bus, the second data may be padded with one or more bits of dummy data. Here, the boundary in memory of input buffer 104 between address range 1 and address range 2 is dynamic. For example, in the context of FIG. 1A, a location in memory of input buffer 104 at which the one or more bits of dummy data $DD_1$ end and the second portion of the message $M_2$ begins is dynamic based on a size of the first portion of the message $M_1$ plus a size of the one or more bits of dummy data $DD_1$.

As shown by reference 154, data component 106 determines a length of the first portion of the message and a length of the second portion of the message. In some implementations, data component 106 determines the length of the first portion of the message and the length of the second portion of the message after the first data is stored in the first address range and after the second data is stored in the second address range. That is, data component 106 may determine the lengths of the first and second portions of the message after the first and second data are transferred to and stored by cryptographic accelerator 102.

In some implementations, data component 106 determines the length of the first portion of the message and the length of the second portion of the message from a first software accessible length register and a second software accessible length register, respectively. For example, software associated with cryptographic accelerator 102 may configure cryptographic accelerator 102 with a set of parameters to be used in association with performing a cryptographic operation based on the first and second data. In some implementations, this configuration is performed after (or concurrent with) transfer of the first data and/or the second data to cryptographic accelerator 102. In some implementations, the set of parameters includes an indication of a length of the first portion of the message, which can be stored in the first software accessible length register, and an indication of the length of the second portion of the message, which can be stored in the second software accessible length register. The set of parameters can further include one or more other parameters associated with performing the cryptographic operation, such as an indication of a type of cryptography to be used, an indication of a key to be used, or the like. Here, data component 106 determines the lengths of the first and second portions of the message based on the lengths configured in the first and second software accessible length registers, respectively.

As shown by reference 156, data component 106 then reads the first portion of the message from the first address range based on the length of the first portion of the message determined in the manner described above. Next, as shown by reference 158, data component 106 discards any dummy data in the first address range based on the length of the first portion and an indication of an endpoint of the first data in the first address range. For example, data component 106 may determine, based on the length of the first portion of the message, a location in the first address range at the first portion of the data ends. Here, data component 106 may discard any dummy data between the location of the end of the first portion of the message and the indicated endpoint of the first data in the first address range (since between the end of the first portion of the message and the endpoint of the first data will be dummy data).

In some implementations, the indication of the endpoint of the first data in the first address range is based on a byte counter associated with the first data. For example, data component 106 may utilize a byte counter that counts a number of bytes stored in association with storing the first data. Here, a number of bytes counted by the byte counter indicates the endpoint of the first data based on the byte counter. Alternatively, in some implementations, the indication of the endpoint of the first data in the first address range is based on a stored write-pointer location associated with storing the first data. For example, when input buffer 104 is realized as a ring buffer, a write-pointer value can be stored after storing of the first data in the first address range. Here, the endpoint of the first data in the first address range can be determined by evaluating a difference between the stored write-pointer and a current value of a read-pointer.

In some implementations, in association with discarding any dummy data in the first address range, data component 106 may identify one or more bits of dummy data in the first address range based on the length of the first portion and the indication of the endpoint of the first data in the first address range. Data component 106 may then discard the one or more bits of dummy data either by reading the one or more bits of dummy data from input buffer 104 without processing the one or more bits of dummy data, or by setting a read-pointer associated with reading data from input buffer 104 to a stored write-pointer location associated with storing the first data.

As shown in FIG. 1B by reference 160, data component 106 also reads the second portion of the message from the second address range based on the length of the second portion of the message determined in the manner described above. Next, as shown by reference 162, data component 106 discards any dummy data in the second address range based on the length of the second portion and an indication of an endpoint of the second data in the second address range. For example, data component 106 may determine, based on the length of the second portion of the message, a location in the second address range at the second portion of the data ends. Here, data component 106 may discard any dummy data between the location of the end of the second portion of the message and the indicated endpoint of the second data in the second address range (since between the end of the second portion of the message and the endpoint of the second data will be dummy data). In some implementations, the indication of the endpoint of the second data in the second address range is based on a byte counter associated with the second data or a stored write-pointer location associated with the storing the second data, similar to a manner described above in association with the first data.

In some implementations, in association with discarding any dummy data in the second address range, data component 106 may identify one or more bits of dummy data in the second address range based on the length of the second portion and the indication of the endpoint of the second data in the second address range. Data component 106 may then discard the one or more bits of dummy data either by reading the one or more bits of dummy data from input buffer 104 without processing the one or more bits of dummy data or by setting a read-pointer associated with reading data from input buffer 104 to a stored write-pointer location associated with storing the second data.

As shown in FIG. 1C by reference 164, data component 106 may forward or otherwise provide the first portion of the message and the second portion of the message (without dummy data) to cryptographic engine 108. As shown by reference 166, cryptographic engine 108 may perform a cryptographic operation using the first portion of the message and the second portion of the message. As shown by reference 168, cryptographic engine 108 may provide an output of the cryptographic operation (e.g., a secure communication message generated from the first portion of the message and the second portion of the message) to output buffer 110, and output buffer 110 may transmit the output accordingly (e.g., to a communication component the system (not shown)).

Notably, the message described in example 100 includes a first portion and a second portion. However, in some implementations, the message may include one or more additional portions. For example, the message may include a first portion (e.g., a nonce portion), a second portion (e.g., an AAD portion) and a third portion (e.g., a plain text portion). In such a case, input buffer 104 may be further configured to store third data in a particular address range, where the third data includes the third portion of the message. Here, data component 106 may determine a length of the third portion of the message, read the third portion from the particular address range based on the length of the third portion, and discard any dummy data in the particular address range based on the length of the third portion and an indication of an endpoint of the third data in the particular address range in the manner described herein. Further, cryptographic engine 108 may perform the cryptographic operation using the third portion of the message (in addition to the first and second portions of the message).

In some implementations, the particular address range in which the third data is stored is a third address range (e.g., an address range other than the first and second address ranges). Put generally, in some implementations, N (N≥1) address ranges may be used, where each of the N address ranges is used for storing a respective one of N items of data, each including one of N portions of a message.

Alternatively, in some implementations, the particular address range in which the third data is stored is the first address range. For example, it is not required that given data (e.g., including a given portion of a message) is stored in a dedicated address range, only that the given data is written in a different address range than last-stored data. This is required for data component 106 to maintain knowledge of where to store a ring buffer pointer. As a result, alternatingly writing between two or more address ranges can be used. For example, the message may include a first portion, a second portion, and a third portion, as described above. Here, first data including the first portion of the message may be stored in the first address range, then second data including the second portion of the message may be stored in the second address range, and then third data including the third portion of the message may be stored in the first address range. Additional data can be stored alternating between the first and second address ranges in a similar manner. Put generally, in some implementations, M>1 address ranges may be used, where N items of data, each including one of N portions of a message, are stored alternatingly among the M address ranges (e.g., such that no address range is used for storing consecutively received items of data).

As indicated above, FIGS. 1A-1C are provided as an example. Other examples may differ from what is described with regard to FIGS. 1A-1C. The number and arrangement of components shown in FIGS. 1A-1C are provided as an example. In practice, there may be additional components, fewer components, different components, or differently arranged components than those shown in FIGS. 1A-1C. Furthermore, two or more components shown in FIGS. 1A-1C may be implemented within a single component, or a single component shown in FIGS. 1A-1C may be implemented as multiple, distributed components. Additionally, or alternatively, a set of components (e.g., one or more components) shown in FIGS. 1A-1C may perform one or more functions described as being performed by another set of components shown in FIGS. 1A-1C.

Figure 2:
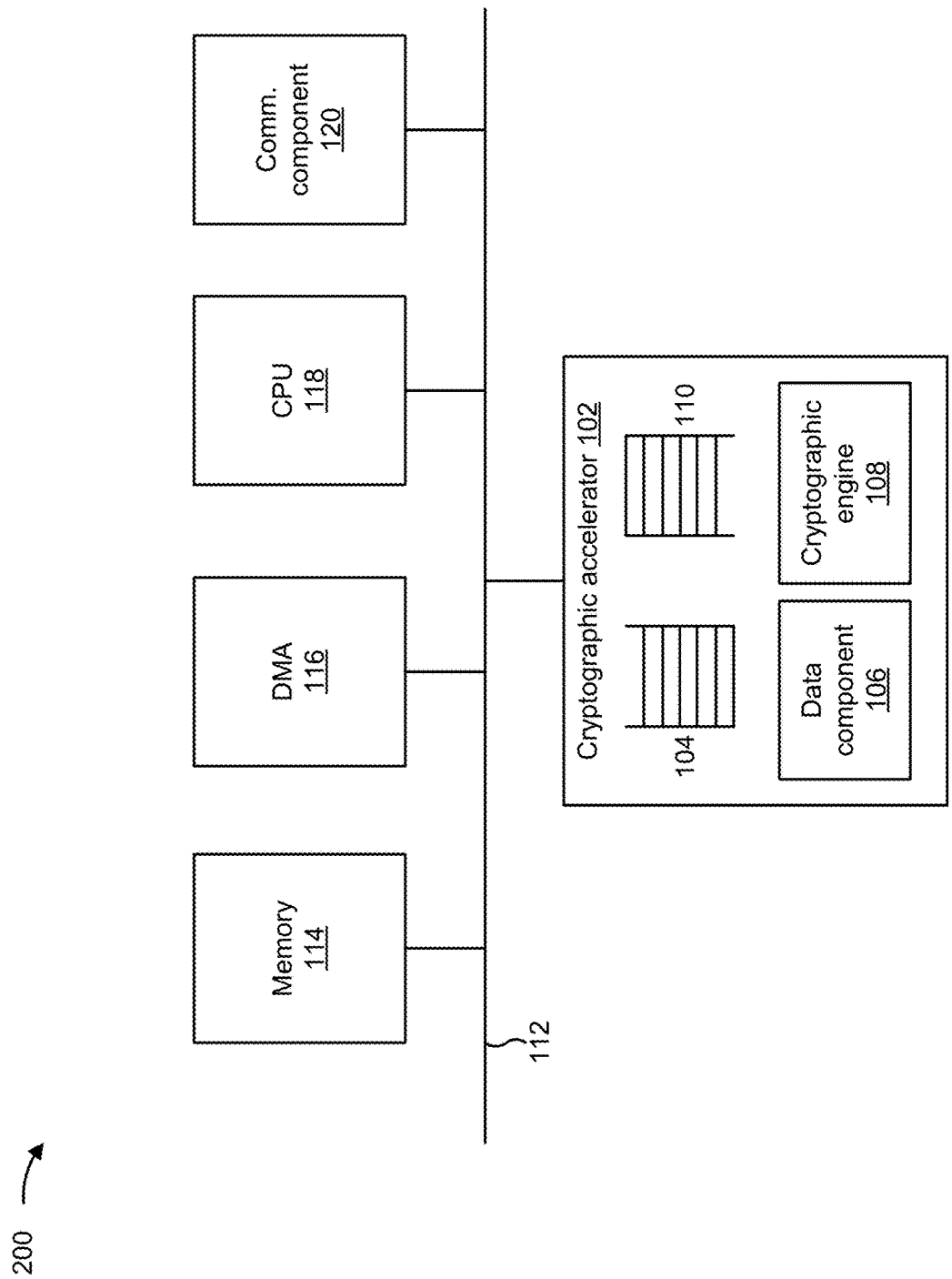
FIG. 2 is a diagram of an example system in which the cryptographic accelerator described herein may be implemented.

FIG. 2 is a diagram of an example system 200 in which cryptographic accelerator 102 may be implemented. In some implementations, system 200 may be a SoC. As shown in FIG. 2, system 200 may include cryptographic accelerator 102, as well as a bus 112, a memory 114, a DMA 116, a CPU 118, and a communication component 120.

Cryptographic accelerator 102 is component to perform cryptographic operations associated with system 200, as described herein. Further details regarding cryptographic accelerator 102 are provided above with respect to FIGS. 1A-1C.

Bus 112 is a component that enables communication among the components of system 200. For example, bus 112 may enable cryptographic accelerator 102 to receive data from memory 114 and/or DMA 116. As another example, bus 112 may enable cryptographic accelerator 102 to transmit data to communication component 120.

Memory 114 is a component to store and provide portions of a message to be processed by cryptographic accelerator 102. For example, memory 114 may store a first portion of a message and a second portion of message based on which cryptographic accelerator 102 is to perform a cryptographic operation. In some implementations, memory 114 may be include a RAM, a read only memory (ROM), and/or another type of memory (e.g., a flash memory, a magnetic memory, and/or an optical memory).

DMA 116 is a component to provide data stored by memory 114 to cryptographic accelerator 102 (e.g., data including a portion of a message stored by memory 114). In some implementations, DMA 116 provides data stored by memory 114 to cryptographic accelerator 102 independent of CPU 118 (i.e., DMA 116 provides direct memory access). For example, independent of CPU 118, DMA 116 may be capable of providing first data to cryptographic accelerator 102 that includes the first portion of the message, and providing second data to cryptographic accelerator 102 include the second portion of the message, as described herein.

CPU 118 includes a central processing unit, a graphics processing unit, a microprocessor, a controller, a microcontroller, a digital signal processor, a field-programmable gate array, an application-specific integrated circuit, and/or another type of processing component. In some implementations, CPU 118 is implemented in hardware, firmware, or a combination of hardware and software. In some implementations, CPU 118 includes one or more processors capable of being programmed to perform a function.

Communication component 120 includes enables system 200 to communicate with other devices, such as via a wired connection and/or a wireless connection. For example, communication component 120 may include a receiver, a transmitter, a transceiver, a modem, a network interface card, an antenna, and/or the like.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of system 200 may perform one or more functions described as being performed by another set of components of system 200.

Figure 3:
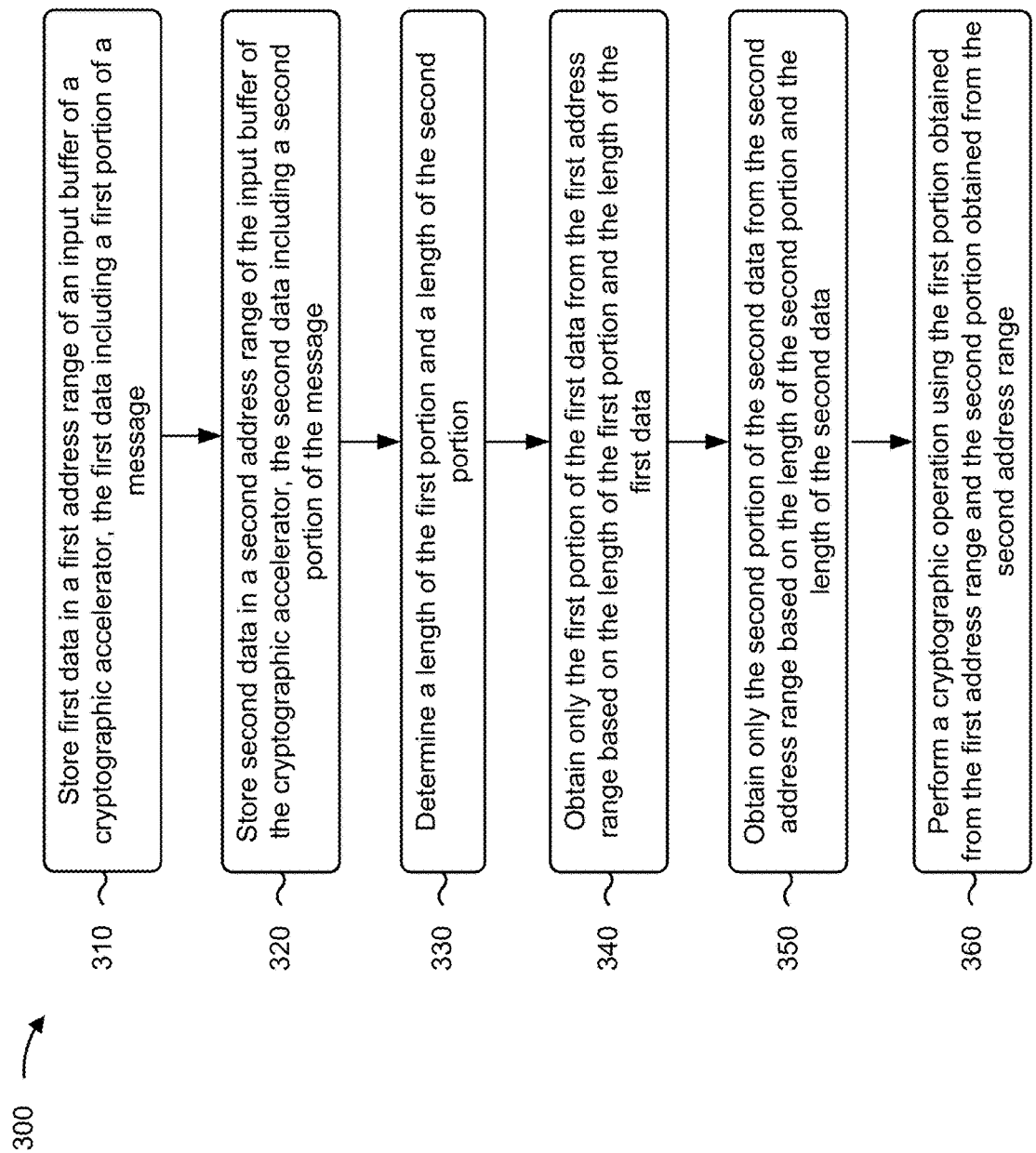
FIG. 3 is a flowchart of an example process relating to dummy data removal in an AEAD cryptographic scheme, in accordance with various aspects of the present disclosure.

FIG. 3 is a flowchart of an example process 300 associated with dummy data removal in an AEAD cryptographic scheme. In some implementations, one or more process blocks of FIG. 3 may be performed by a cryptographic accelerator (e.g., cryptographic accelerator 102).

As shown in FIG. 3, process 300 may include storing first data in a first address range of an input buffer of a cryptographic accelerator, the first data including a first portion of a message (block 310). For example, the cryptographic accelerator may (e.g., using input buffer 104) store first data in a first address range of an input buffer of a cryptographic accelerator, the first data including a first portion of a message, as described above.

As further shown in FIG. 3, process 300 may include storing second data in a second address range of the input buffer of the cryptographic accelerator, the second data including a second portion of the message (block 320). For example, the cryptographic accelerator may (e.g., using input buffer 104) store second data in a second address range of the input buffer of the cryptographic accelerator, the second data including a second portion of the message, as described above.

As further shown in FIG. 3, process 300 may include determining a length of the first portion and a length of the second portion (block 330). For example, the cryptographic accelerator may (e.g., using data component 106) determine a length of the first portion and a length of the second portion, as described above.

As further shown in FIG. 3, process 300 may include obtaining the first portion of the first data from the first address range based on the length of the first portion and the length of the first data (block 340). For example, the cryptographic accelerator may (e.g., using data component 106) obtain the first portion of the first data from the first address range based on the length of the first portion and the length of the first data, as described above.

As further shown in FIG. 3, process 300 may include obtaining the second portion of the second data from the second address range based on the length of the second portion and the length of the second data (block 350). For example, the cryptographic accelerator may (e.g., using data component 106) obtain the second portion of the second data from the second address range based on the length of the second portion and the length of the second data, as described above.

As further shown in FIG. 3, process 300 may include performing a cryptographic operation using the first portion obtained from the first address range and the second portion obtained from the second address range (block 360). For example, the cryptographic accelerator may (e.g., using cryptographic engine 108) perform a cryptographic operation using the first portion obtained from the first address range and the second portion obtained from the second address range, as described above.

Process 300 may include additional implementations, such as any single implementation or any combination of implementations described below and/or in connection with one or more other processes described elsewhere herein.

In a first implementation, the length of the first portion and the length of the second portion are determined after storing the first data in the first address range and after storing the second data in the second address range.

In a second implementation, alone or in combination with the first implementation, obtaining the first portion of the first data from the first address range comprises reading the first portion from the first address range based on the length of the first portion, and discarding any dummy data in the first address range based on the length of the first portion and an indication of an endpoint of the first data.

In a third implementation, alone or in combination with one or more of the first and second implementations, obtaining the second portion of the second data from the second address range comprises reading the second portion from the second address range based on the length of the second portion, and discarding any dummy data in the second address range based on the length of the second portion and an indication of an endpoint of the second data in the second address range.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A cryptographic accelerator, comprising:
   an input buffer to:
      store first data in a first address range, the first data including a first portion of a message, and
      store second data in a second address range, the second data including a second portion of the message;
   one or more components to:
      determine a length of the first portion and a length of the second portion,
      read the first portion from the first address range based on the length of the first portion,
      identify one or more bits of dummy data in the first address range based on the length of the first portion and an indication of an endpoint of the first data in the first address range,
      discard the one or more bits of dummy data by at least one of:
         reading the one or more bits of dummy data from the input buffer without processing the one or more bits of dummy data, or
         setting a pointer associated with reading data from the input buffer to a location related to storing the first data,
      read the second portion from the second address range based on the length of the second portion,
      discard dummy data in the second address range based on the length of the second portion and an indication of an endpoint of the second data in the second address range; and
   a cryptographic engine to perform a cryptographic operation using the first portion and the second portion.

2. The cryptographic accelerator of claim 1, wherein the first portion of the message is an additional authenticated data (AAD) portion of the message and the second portion of the message is a plain text portion of the message.

3. The cryptographic accelerator of claim 1, wherein the length of the first portion and the length of the second portion are determined after the first data is stored in the first address range and after the second data is stored in the second address range.

4. The cryptographic accelerator of claim 1, wherein the length of the first portion and the length of the second portion are determined from respective software accessible length registers.

5. The cryptographic accelerator of claim 1, wherein the indication of the endpoint of the first data in the first address range is based on a byte counter associated with the first data or a stored write-pointer location associated with storing the first data.

6. The cryptographic accelerator of claim 1, wherein the indication of the endpoint of the second data in the second address range is based on a byte counter associated with the second data or a stored write-pointer location associated with storing the second data.

7. The cryptographic accelerator of claim 1, wherein the one or more bits of dummy data are first one or more bits of first dummy data, and wherein the one or more components, when discarding second one or more bits of second dummy data in the second address range, are to:
   identify the second one or more bits of the second dummy data in the second address range based on the length of the second portion and the indication of the endpoint of the second data in the second address range, and
   discard the second one or more bits of the second dummy data by at least one of:
      reading the second one or more bits of the second dummy data from the input buffer without processing the second one or more bits of the second dummy data, or
      setting a read-pointer associated with reading data from the input buffer to a stored write-pointer location associated with storing the second data.

8. The cryptographic accelerator of claim 1, wherein the input buffer is further to store third data in a particular address range, the third data including a third portion of the message,
   wherein the particular address range being either a third address range or the first address range,
   wherein the one or more bits of dummy data are first one or more bits of first dummy data,
   wherein the one or more components are further to:
      determine a length of the third portion,
      read the third portion from the particular address range based on the length of the third portion,
      discard second one or more bits of second dummy data in the particular address range based on the length of the third portion and an indication of an endpoint of the third data in the particular address range, and
   wherein the cryptographic engine is further to perform the cryptographic operation using the third portion.

9. A system, comprising:
   a memory to store a first portion of a message and a second portion of the message;
   a direct memory access component to:
      provide first data to a cryptographic accelerator, the first data including the first portion of the message, and
      provide second data to the cryptographic accelerator, the second data including the second portion of the message; and
   the cryptographic accelerator to:
      store the first data in a first address range of an input buffer,
      store the second data in a second address range of the input buffer,
      determine a length of the first portion and a length of the second portion after the first data is stored in the first address range and after the second data is stored in the second address range,
      identify one or more bits of dummy data in the first address range based on the length of the first portion and an indication of an endpoint of the first data in the first address range,
      discard the one or more bits of dummy data by at least one of:
         reading the one or more bits of dummy data from the input buffer without processing the one or more bits of dummy data, or
         setting a pointer associated with reading data from the input buffer to a location related to storing the first data, and
      discard dummy data included in the second data based on the length of the first portion and an indication of an endpoint of the second data.

10. The system of claim 9, wherein the cryptographic accelerator is further to:
    read the first portion from the first address range based on the length of the first portion,
    read the second portion from the second address range based on the length of the second portion, and
    perform a cryptographic operation using the first portion and the second portion.

11. The system of claim 9, wherein the length of the first portion and the length of the second portion are determined from respective software accessible length registers.

12. The system of claim 9, wherein the indication of the endpoint of the first data in the first address range is based on a byte counter associated with the first data or a stored write-pointer location associated with the storing the first data.

13. The system of claim 9, wherein the indication of the endpoint of the second data in the second address range is based on a byte counter associated with the second data or a stored write-pointer location associated with the storing the second data.

14. The system of claim 9, wherein the one or more bits of dummy data are first one or more bits of first dummy data, and wherein the cryptographic accelerator, when discarding second one or more bits of second dummy data in the second address range, is to:
  identify the second one or more bits of the second dummy data in the second address range based on the length of the second portion and the indication of the endpoint of the second data in the second address range, and
  discard the second one or more bits of the second dummy data by at least one of:
    reading the second one or more bits of the second dummy data from the input buffer without processing the second one or more bits of the second dummy data, or
    setting a read-pointer associated with reading data from the input buffer to a stored write-pointer location associated with storing the second data.

15. A method, comprising:
  storing first data in a first address range of an input buffer of a cryptographic accelerator, the first data including a first portion of a message;
  storing second data in a second address range of the input buffer of the cryptographic accelerator, the second data including a second portion of the message;
  determining a length of the first portion and a length of the second portion;
  obtaining the first portion of the first data from the first address range based on the length of the first portion and the length of the first data;
  identifying one or more bits of dummy data in the first address range based on the length of the first portion and an indication of an endpoint of the first data in the first address range,
  discarding the one or more bits of dummy data by at least one of:
    reading the one or more bits of dummy data from the input buffer without processing the one or more bits of dummy data, or
    setting a pointer associated with reading data from the input buffer to a location related to storing the first data;
  obtaining the second portion of the second data from the second address range based on the length of the second portion and the length of the second data; and
  performing a cryptographic operation using the first portion obtained from the first address range and the second portion obtained from the second address range.

16. The method of claim 15, wherein the length of the first portion and the length of the second portion are determined after storing the first data in the first address range and after storing the second data in the second address range.

17. The method of claim 15, wherein obtaining the first portion of the first data from the first address range comprises:
  reading the first portion from the first address range based on the length of the first portion, and
  discarding the one or more bits of dummy data in the first address range based on the length of the first portion and an indication of an endpoint of the first data.

18. The method of claim 15, wherein the one or more bits of dummy data are first one or more bits of first dummy data, wherein obtaining the second portion of the second data from the second address range comprises:
  reading the second portion from the second address range based on the length of the second portion, and
  discarding second one or more bits of second dummy data in the second address range based on the length of the second portion and an indication of an endpoint of the second data in the second address range.

19. The method of claim 15, wherein the length of the first portion and the length of the second portion are determined after the first data is stored in the first address range and after the second data is stored in the second address range.

20. The method of claim 15, wherein the indication of the endpoint of the first data in the first address range is based on a byte counter associated with the first data or a stored write-pointer location associated with storing the first data.

* * * * *